Figure 1:
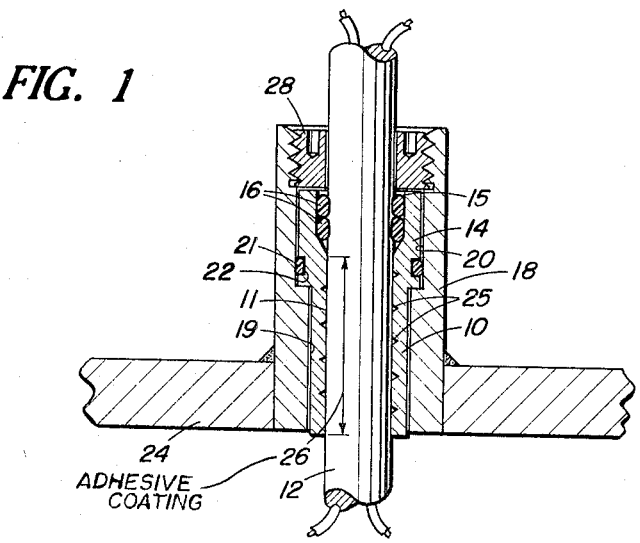

Oct. 25, 1966 S. H. KAUFFMAN 3,281,155
PRESSURE FITTINGS
Filed Aug. 30, 1963

INVENTOR.
Samuel H. Kauffman
BY
Thomas O. Watson Jr.
ATTORNEYS

United States Patent Office 3,281,155
Patented Oct. 25, 1966

3,281,155
PRESSURE FITTINGS
Samuel H. Kauffman, 10807 Blossom Lane,
Silver Spring, Md.
Filed Aug. 30, 1963, Ser. No. 305,894
8 Claims. (Cl. 277—64)

The invention described herein may be manufactured and used by or for the Government of the United States of America for governmental purposes without the payment of any royalties thereon or therefor.

This invention relates to pressure fittings, and more particularly to pressure fittings for providing a fluid seal between a pressure hull and an electrical cable or other cylindrical member penetrating the pressure hull to enable maintenance of a pressure differential across the hull.

In the past, fluid seals around electrical cables and other cylindrical members which penetrate pressure hulls have been provided through the use of conventional packing glands. Conventional packing glands rely upon compression of a packing material within a confined space to force the packing material into sealing engagement with the electrical cable or other cylindrical member being packed. The packing material used in conventional packing glands may take the form of rubber grommets, a plurality of washers, or string packing, as well as various other forms.

While conventional packing glands function satisfactorily in some applications, they possess certain inherent defects which render their performance unsatisfactory in many instances. For example, skill and care must be exercised in the installation of conventional packing glands. If the packing material is insufficiently compressed during installation, the gland begins to leak immediately upon use or the application of pressure thereto. If the packing material is excessively compressed during installation, leakage frequently occurs after a short period of use. Also, excessive compression of the packing material will result in the rupture of the sheathing on electrical cables or distortion of the cables and the loss of a tight seal due to the voids within the cable between the individual strands thereof. Still further, conventional packing glands require periodic readjustment if pressure integrity is to be maintained over a long period of time. Manifestly, it would be highly desirable if a pressure fitting could be provided which would possess all the advantages of conventional packing glands without the incorporation therein of the aforedescribed and other disadvantages inherent in the use of conventional packing glands.

It is therefore an object of the present invention to provide pressure fittings free of the disadvantages inherent in conventional packing glands.

It is another object of this invention to provide pressure fittings which will maintain a fluid tight seal over a long period of time independent of the skill of installing personnel.

It is a further object of the present invention to provide pressure fittings which will provide fluid tight seals over long periods of time without the need for periodic maintenance.

It is yet another object of the present invention to provide pressure fittings in which the sealing members are independent of the members utilized to restrain relative movement between the members being sealed.

It is a still further object of the present invention to provide pressure fittings which may be installed conveniently on long cylindrical members a considerable distance from the ends thereof.

With these and other objects in view, the present invention contemplates a pressure fitting for providing a fluid seal between a pressure hull and an electrical cable or other cylindrical member comprising a sleeve which is designed to encompass the cable or cylindrical member and snugly fit about the periphery thereof. The sleeve is provided with an enlarged end portion having a counterbored recess formed therein of a diameter greater than the internal diameter of the sleeve. One or more O-rings are disposed within this counterbored recess to provide a fluid seal between the sleeve and the cable or cylindrical member. A deck fitting encompasses the sleeve and is provided with a counterbored portion which accommodates the enlarged end portion of the sleeve. One or more O-rings are disposed within this counterbored portion and provide a fluid seal between the sleeve and the deck fitting. The deck fitting is in turn welded or otherwise secured to the pressure hull or other pressure vessel which is to be penetrated by the cable or cylindrical member. Means are also provided for securing the cable and cylindrical member to the sleeve and for securing the sleeve to the deck fitting to preclude relative movement between these various parts. This embodiment of the invention is intended for use on cables and other cylindrical members where the pressure fitting may be on or adjacent one end of the cable or cylindrical member.

An alternative embodiment of the invention, for installation on cables and other cylindrical members at a position spaced a considerable distance from the ends thereof, contemplates a similar fitting in which the sleeve that embraces the cable or cylindrical member is longitudinally split into two mating parts. The enlarged end portion of the sleeve is formed by a separate O-ring collar which is threaded onto one end of the sleeve after the mating parts have been assembled on the cable or cylindrical member. A retaining collar is slipped over the other end of the split sleeve after the parts have been mated. This embodiment also includes means for securing the sleeve to the cable or cylindrical member and for fixing the sleeve relative to the deck fitting to preclude relative movement between these parts.

Figure 2:
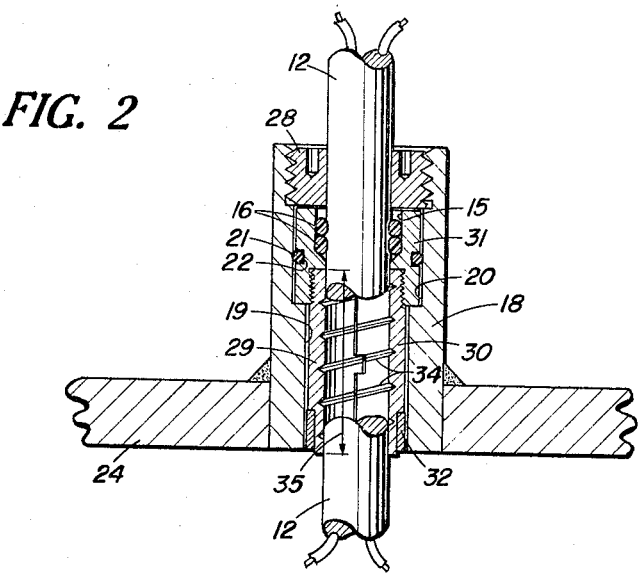

Other objects, advantages, and novel features of the present invention will become readily apparent upon consideration of the following detailed description, when read in conjunction with the accompanying drawings wherein:

FIG. 1 is an illustration of an improved pressure fitting which may be utilized on electrical cables and other cylindrical members adjacent the ends thereof; and FIG. 2 is an illustration of a second embodiment of the invention which is an improved pressure fitting that may be conveniently installed on electrical cables and other cylindrical members at a point considerably removed from the ends thereof.

Attention now is directed to the drawings, wherein like numerals of reference designate like parts throughout the several views, and more particularly to FIG. 1, for a description of the embodiment of the present invention suitable for use at or near one end of an electrical cable or other cylindrical member. The pressure fitting of the present invention comprises a sleeve 10 having a centrally disposed, axial aperture 11 formed therein, and is adapted to encompass a cable or cylindrical member 12. The diameter of the aperture 11 is selected to provide a snug fit on the cable 12. The sleeve 10 is provided with an enlarged end portion 14 which is in turn provided with a counterbored recess 15 of a diameter greater than the diameter of the aperture 11. A pair of O-rings 16 are disposed within the counterbored recess 15 to provide a fluid seal between the cable or cylindrical member 12 and the enlarged end portion 14 of the sleeve 10. The ratio of the diameter of the counterbored recess 15 to the diameter of the cable or cylindrical member 12 is preselected to provide the desired loading of the O-rings 16.

A deck fitting 18 encompasses the sleeve 10 and is provided with an axial opening 19 and a counterbored portion 20 which accommodates the sleeve 10 and enlarged end portion 14, respectively. An O-ring 21 is disposed within the counterbored portion 20 and within a groove 22 formed in the enlarged end portion 14 to provide a fluid seal between the enlarged end portion 14 and the deck fitting 18. The deck fitting 18 is welded or otherwise secured in fluid tight relationship to a deck or wall 24 of a pressure hull or pressure vessel which is to be penetrated by the cable or cylindrical member 12.

The aforedescribed elements will provide a good fluid seal when assembled as illustrated in FIG. 1. When it is contemplated that axial loads may be applied to the cable or cylindrical member 12, additional elements are necessary. If the member 12 is an electrical cable or other member having a readily deformable exterior surface, the diameter of the aperture 11 is made slightly smaller than the diameter of the cable 12. The interior surface of the sleeve 10 is also provided with a helical groove 25. When the sleeve 10 is forced onto the end of the cable 12, the cable sheathing or other deformable material extrudes slightly into the groove 25 to provide a firm frictional bond. The frictional bond must at least be capable of withstanding a force on the member 12 equal to the maximum design pressure times the cross-sectional area of the member 12. When high axial loads on the member 12 are contemplated, the area designated by the arrow 26 may be coated with a suitable adhesive (such as Eastman 910) in order to increase the strength of the bond. On the other hand, if the exterior surface of the member 12 is not readily deformable, the diameter of the aperture 11 is selected to provide the sliding fit on the member 12 and the area 26 is coated with adhesive. The helical groove 25 is still used since it will enhance the strength of the adhesive bond. In either of the above cases, a toroidally shaped retaining plug 28 is threaded into the end of the deck fitting 18 to preclude movement of the enlarged end portion 14 and hence of the sleeve 10. This complete arrangement enables the application of axial loads to the member 12 without interruption of the fluid seal and without the axial loads being carried by the sealing members (O-rings 16 and 21).

Attention now is directed to FIG. 2 of the drawings for a description of a second embodiment of the present invention which may be utilized where the pressure fitting is to be applied to an electrical cable or other cylindrical member at a distance considerably removed from the ends thereof. In this case the sleeve is a split sleeve formed of mating halves 29 and 30. An O-ring collar 31 is threaded on the split sleeve after the halves 29 and 30 have mated and is analogous to the enlarged end portion 14 of the embodiment shown in FIG. 1. A retaining collar 32 is slipped over the other end of the sleeve after the halves 29 and 30 have been mated to assist the O-ring collar 31 in holding the halves together. A helical groove 34 is formed on the interior surfaces of the split sleeve halves 29 and 30. This embodiment of the invention is functionally identical with the embodiment shown in FIG. 1 although the assembly is somewhat different. The O-ring collar 31 and retaining collar 32 are slipped over one end of the member 12 and slid to the position where the pressure fitting is to be applied. If the exterior of the member 12 is readily deformable, a simple jig (not shown) is placed around the parts 29 and 30 of the split sleeve after they have been assembled on the member 12, and then tightened to slightly deform the exterior of the member 12 and to cause extrusion of portions thereof into the groove 34. The O-ring collar 31 is then threaded onto one end of the split sleeve, the securing collar 32 is then slipped over the other end of the split sleeve, and the jig or clamp is then removed. If high axial loads on the member 12 are contemplated, the area designated by the arrow 35 is coated with adhesive prior to placement of the split sleeve halves 29 and 30 on the member 12. On the other hand, if the member 12 is not readily deformable, the clamp or jig is omitted and the bond between the sleeve and member 12 is obtained by coating the area 35 with adhesive. In either of these cases, as before, the retaining plug 28 is threaded into the end of the deck fitting 18 to preclude movement of the sleeve relative to the deck fitting.

From the foregoing, it will be readily apparent that the present invention provides pressure fittings possessing numerous advantages not found in prior art packing glands. For example, the quality of the fluid seal obtained is independent of the skill of the personnel performing the installation as long as the various parts are not damaged due to abusive handling since the loading of the O-rings is predetermined by the design of the fittings. Also, the present invention provides pressure fittings wherein axial loads applied to one of the members being sealed are not carried or opposed by the sealing members themselves. Still further, the size and space requirements of a pressure fitting to accommodate a given size of cable or cylindrical member has been substantially reduced over that required by conventional packing glands. And finally, the present invention provides a pressure fitting which is free from the need for periodic maintenance when the fluid seal is to be maintained over long periods of time.

It is to be understood that the above-described arrangements are simply illustrative of preferred embodiments of the present invention. Numerous other arrangements may be readily devised by those skilled in the art to achieve similar devices still embodying the principles of the present invention and falling within the spirit and scope thereof.

What is claimed is:

1. A pressure fitting for providing a fluid seal between a pressure hull and an electrical cable penetrating said pressure hull to enable maintenance of a pressure differential across said hull comprising:

a sleeve for encompassing said cable, said sleeve having an enlarged end portion and a counterbored recess formed in said end portion, at least one O-ring disposed within said counterbored recess for providing a fluid seal between said sleeve and said cable, a deck fitting having an axial opening including a counterbored portion encompassing said sleeve with the enlarged end portion of said sleeve disposed in the counterbored portion of said opening, said deck fitting being adapted to be attached to said pressure hull in fluid tight relationship, at least one O-ring surrounding said enlarged end portion of said sleeve and disposed within said counterbored portion in said deck fitting so as to be in close contacting relationship with said sleeve and the internal peripheral area of the counterbored portion of said deck fitting for providing a fluid seal between said deck fitting and said sleeve, and including a toroidally shaped retaining plug for encompassing said cable and atttached to said deck fitting adjacent the enlarged end portion of said sleeve to preclude relative movement therebetween.

2. A pressure fitting for providing a fluid seal between a pressure hull and an electrical cable penetrating said pressure hull to enable maintenance of a pressure differential across said hull comprising:

a sleeve for encompassing said cable, said sleeve having an enlarged end portion and a counterbored recess formed in said end portion, helical groove means formed in the interior surface of said sleeve for deforming and frictionally engaging the sheathing of said cable to preclude relative movement between the sleeve and the cable, at least one O-ring disposed within said counterbored recess for providing a fluid seal between said sleeve and said cable, a deck fitting having an axial opening including a counterbored portion encompassing said sleeve with the enlarged end portion of said sleeve disposed in the counterbored portion of said opening, said deck fitting being adapted to be attached to said pressure hull in fluid tight relationship, and at least one O-ring disposed within said counterbored portion in said deck fitting for providing a fluid seal between said deck fitting and said sleeve.

3. A pressure fitting as defined in claim 2 including an adhesive bonding said sleeve to said cable and supplementing the function of said helical groove.

4. A pressure fitting for providing a fluid seal between a pressure hull and an electrical cable penetrating said pressure hull to enable maintenance of a pressure differential across said hull comprising:

a split sleeve for encompassing said cable, an O-ring collar for encompassing said cable attached to one end of said sleeve, said O-ring collar being of greater outside diameter than said sleeve and having a counterbored recess formed in the outer end thereof, at least one O-ring disposed within the counterbored recess in said O-ring collar for providing a fluid seal between said O-ring collar and said cable, a retaining collar encompassing the other end of said sleeve, a deck fitting having an axial opening including a counterbored portion encompassing said sleeve and said O-ring collar with said O-ring collar disposed in the counterbored portion of said opening, said deck fitting being adapted to be attached to said pressure hull in fluid tight relationship, and at least one O-ring disposed within said counterbored portion in said deck fitting for providing a fluid seal between said deck fitting and said O-ring collar.

5. A pressure fitting as defined in claim 4 including means for securing said sleeve to said cable to preclude relative movement.

6. A pressure fitting as defined in claim 4 including a toroidally shaped retaining plug for encompassing said cable and attached to said deck fitting adjacent said O-ring collar to preclude relative movement therebetween.

7. A pressure fitting as defined in claim 5 wherein said securing means is defined by a helical groove formed in the interior surface of said sleeve for deforming and frictionally engaging the sheathing of said cable.

8. A pressure fitting as defined in claim 7 wherein said securing means includes an adhesive bonding said sleeve to said cable and supplementing the function of said helical groove.

References Cited by the Examiner
UNITED STATES PATENTS 1,762,548  6/1930  Davis _____ 285—291 X
2,754,381  7/1956  Martin et al.
3,055,972  9/1962  Peterson _____ 277—4 X LAVERNE D. GEIGER, *Primary Examiner.*

SAMUEL S. ROTHBERG, *Examiner.*

L. J. RANEY, J. MEDNICK, *Assistant Examiners.*